April 16, 1963  P. C. KESLING  3,085,335
ORTHODONTIC LOCK PIN AND BRACKET APPLIANCE
Filed April 3, 1961  2 Sheets-Sheet 2
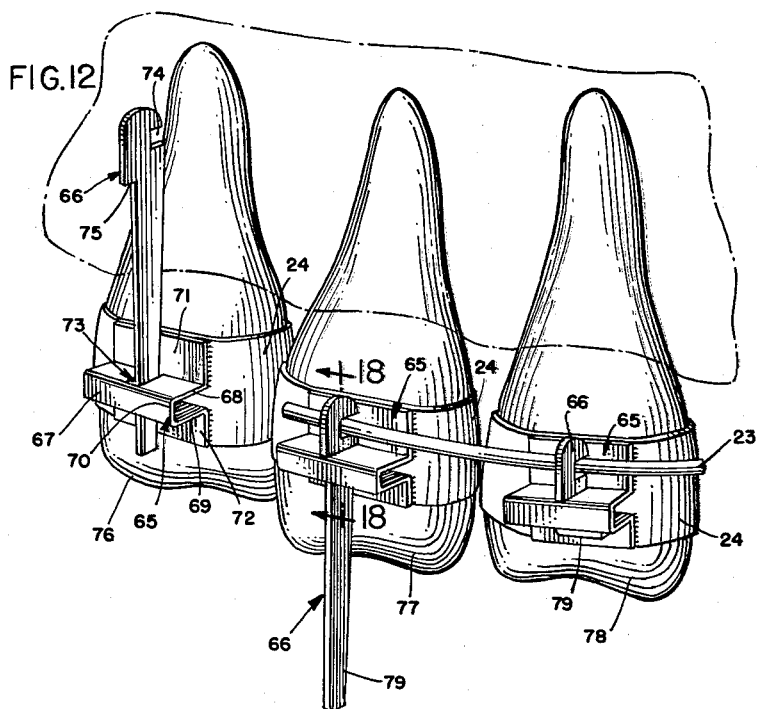
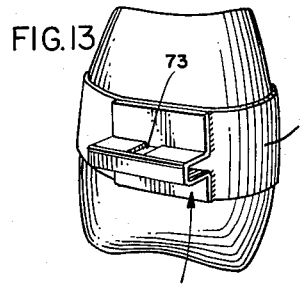
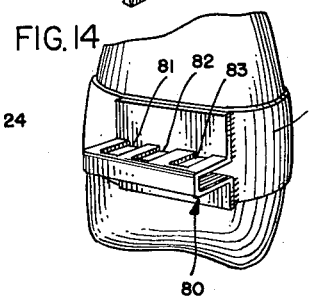
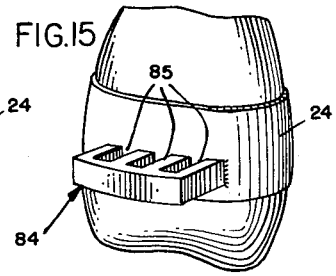
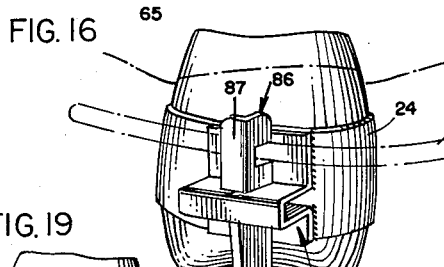
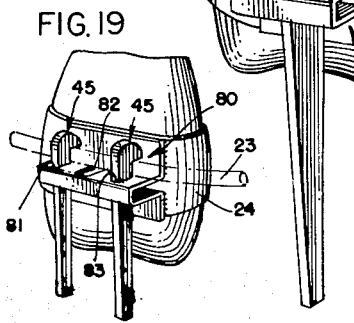
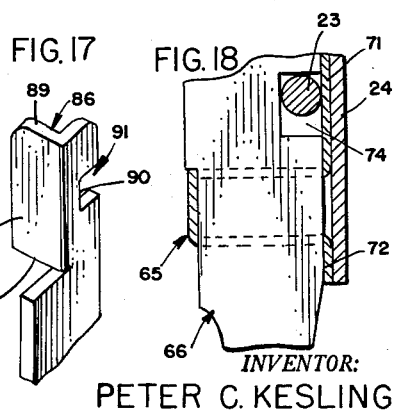
INVENTOR:
PETER C. KESLING
BY
Marshall, Johnston, Cook + Root
ATT'YS

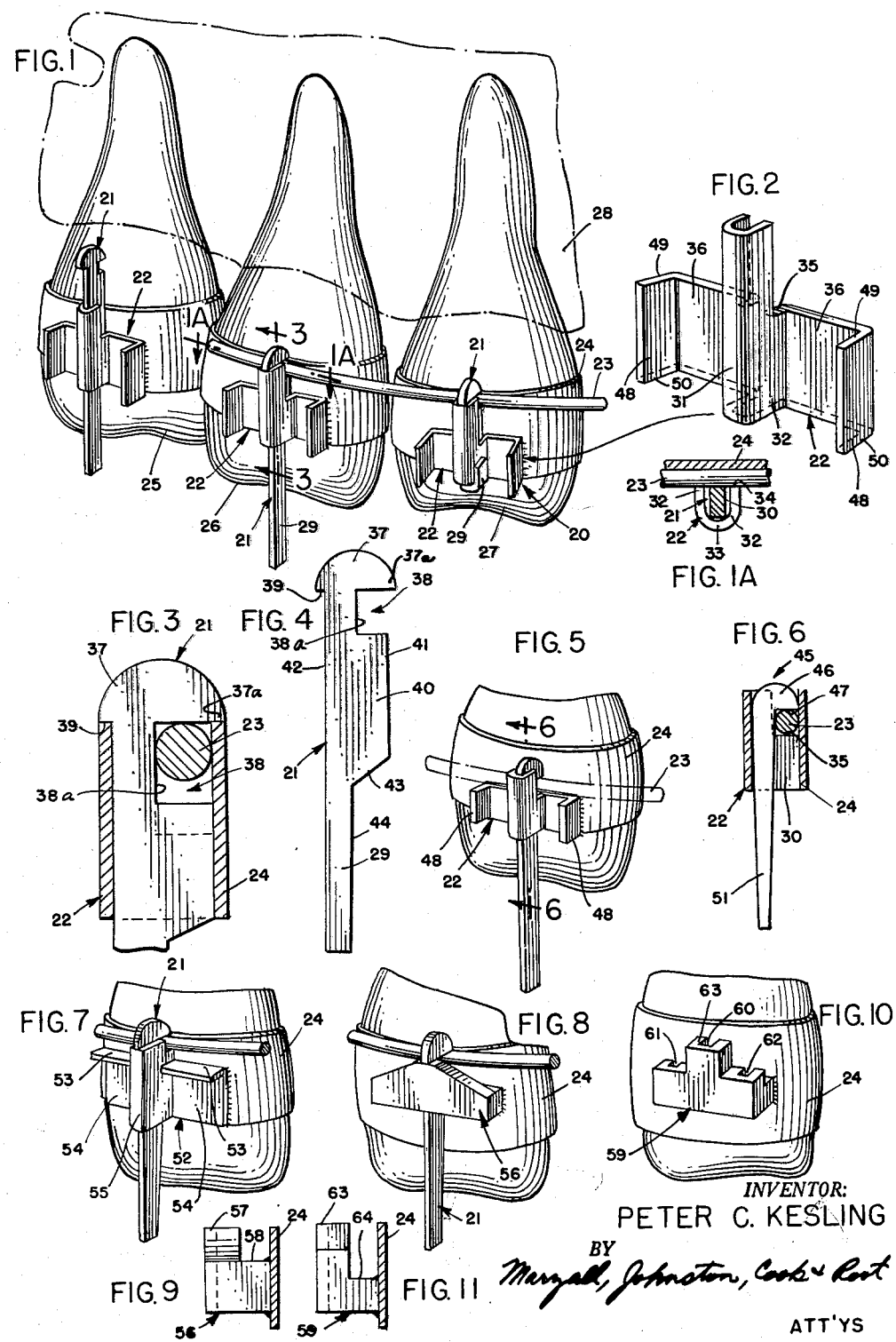
INVENTOR:
PETER C. KESLING

United States Patent Office 3,085,335
Patented Apr. 16, 1963

3,085,335
ORTHODONTIC LOCK PIN AND BRACKET
APPLIANCE
Peter C. Kesling, Green Acres, La Porte, Ind.
Filed Apr. 3, 1961, Ser. No. 100,157
16 Claims. (Cl. 32—14)

This invention relates in general to an orthodontic lock pin and bracket appliance, and more particularly to an orthodontic appliance useful in the processes of straightening teeth, and still more particularly to an appliance especially useful in controlling the straightening movements of all teeth except molars. Moreover, the orthodontic lock pin and bracket appliance of this invention is primarily useful where the light wire differential force technique is applied.

Heretofore, innumerable orthodontic brackets have been developed, some in combination with lock pins and others adapted to be used without lock pins. Where lock pin and bracket combinations have been used, there has been a need for such an appliance that is capable of permitting freedom of tipping of a tooth in the mesial-distal direction.

It is therefore an object of this invention to provide an orthodontic lock pin and bracket appliance which will permit freedom of tooth tipping in the mesial-distal direction.

Another object of this invention is in the provision of an orthodontic lock pin and bracket appliance, wherein the lock pin is so constructed and coacts with the bracket to space the arch wire therefrom and thereby permit freedom of rotation between the appliance and the arch wire in the mesial-distal direction.

A still further object of this invention resides in the provision of an orthodontic lock pin and bracket appliance that may be easily and inexpensively manufactured, as well as being capable of being easily and efficiently handled by the orthodontic practitioner.

An important feature of the present invention is in providing a specially designed lock pin for use in a bracket having one or more slots extending in the occlusal-gingival direction, wherein the lock pin coacts with the bracket to hold the arch wire away from the bracket and yet against the tooth. This arrangement permits the tooth to tip freely in the mesial-distal direction. Preferably, the pins are inserted from the gingival side of the bracket, although it should be appreciated that they may be inserted from the occlusal side, depending upon the desired location of the arch wire.

A further feature of the invention is that the bracket may be used with a lock pin of the usual construction to provide control of the tooth movement in the mesial-distal direction. In this case, the lock pin will not have a shoulder thereon and will be dimensioned to pull the arch wire down against the bracket.

Therefore it is an object of this invention to provide an orthodontic lock pin and bracket appliance for use in controlling tooth movement in the mesial-distal direction.

Other objects, features and advantages of the invention will be apparent from the following detailed disclosure, taken in conjunction with the accompanying sheets of drawings, wherein like reference numerals refer to like parts, in which:

FIG. 1 is a perspective view of three teeth having the orthodontic lock pin and bracket appliance of the present invention and illustrating the initial, intermediate and final stages of assembly;

FIG. 1A is an enlarged cross-sectional view taken substantially along line 1—1 of FIG. 1;

FIG. 2 is an enlarged perspective view of the bracket from the appliance shown in FIG. 1 and removed from the band;

FIG. 3 is a greatly enlarged sectional view taken substantially along line 3—3 of FIG. 1;

FIG. 4 is a side elevational view of a lock pin employed in combination with the bracket appliance of FIG. 1;

FIG. 5 is a perspective view of the lock pin and bracket appliance of the present invention wherein a different lock pin is employed than that shown in FIGS. 1, 3 and 4 for the purpose of providing control of tooth movement in the mesial-distal direction wherein the arch wire is drawn down against the bracket;

FIG. 6 is a sectional view taken substantially along line 6—6 of FIG. 5;

FIG. 7 is a perspective view of a modification of the invention wherein a modified bracket is employed;

FIG. 8 is a perspective view of still another modification of the invention wherein a modified bracket is employed;

FIG. 9 is an end elevational view of the modified bracket of FIG. 8;

FIG. 10 is a perspective view of a bracket mounted on a tooth band and constituting still another modified bracket;

FIG. 11 is an end elevational view of the modified bracket of FIG. 10;

FIG. 12 is a perspective view of three teeth having still further modified lock pin and bracket appliances according to the present invention;

FIG. 13 is a perspective view of a tooth having a bracket thereon like that shown in FIG. 12;

FIG. 14 is a perspective view of a modified form of bracket in accordance with the present invention;

FIG. 15 is a perspective view of a still further modified form of a bracket in accordance with the present invention;

FIG. 16 is a perspective view of an orthodontic lock pin and bracket appliance according to the invention illustrating the bracket as shown in FIG. 12 and a modified lock pin construction;

FIG. 17 is a fregmentary enlarged perspective view of the upper end of the modified lock pin of FIG. 16;

FIG. 18 is an enlarged fragmentary sectional view taken substantially along line 18—18 of FIG. 12; and FIG. 19 is a perspective view of the modified bracket of FIG. 14 and illustrating the use of a pair of conventional lock pins in combination therewith for drawing the arch wire down against the bracket to control tooth movement in the mesial-distal direction.

Referring now to the drawings, and particularly to FIGS. 1-4, the orthodontic lock pin and bracket appliance of the present invention is generally designated by the numeral 20 and includes a lock pin 21 and a bracket 22 adapted to secure an arch wire 23 to a band 24 suitably mounted on a tooth. Three teeth 25, 26 and 27 extending from the gingiva 28 are illustrated as a partial arrangement of teeth for purposes of illustrating the use of the present invention. The lock pin 21 is shown in the initial stage of assembly with the bracket 22 on the tooth 25, while the tooth 26 illustrates the intermediate stage of assembly wherein the lock pin 21 is properly positioned in the bracket and receives the arch wire, and as illustrated on the tooth 27 the occlusal or tail end 29 of the lock pin is bent over the occlusal end of the bracket to secure it in position and thereby preclude the lock pin from subsequently being displaced from the bracket.

The bracket 22 is provided with an occlusal-gingival extending opening 30 defined by a U-shaped in cross section body 31 including substantially parallel opposed legs or walls 32, 32 and a bight portion or connecting wall 33. At the gingival end of the bracket 22, aligned notches in the lingual edge of the legs 32 coact to define with the band 24 a gingival opening slot for receiving the arch wire 23 as held in position by the lock pin 21. The notches are defined by occlusal-gingivally extending, lingual facing edges 34 substantially paralleling the band 24, and buccal- or labial-lingual extending, gingival facing edges 35 which extend substantially perpendicularly to the edges 34. The appliances of the present invention are suitable for use on all teeth except molars, and to simplify the terminology hereinafter employed, "buccal" will be used where "buccal" or "labial" may be used, but it is understood that "buccal" may apply to "buccal" or "labial".

The bracket 22 is further provided with attaching flanges 36, 36 extending in the mesial and distal directions from the legs or walls 32 of the bracket body 31 and at the lingual edge thereof, so that the flanges 36 are adapted to contact the outer surface of the bands 24. The flanges may be suitably secured to the bands by spot welding and/or soldering techniques. The flanges 36 have their gingival ends coplanar with the edges 35 of the bracket notches and their occlusal ends coplanar with the occlusal end of the bracket body.

The lock pin 21 is uniquely constructed to coact with the bracket 22 and pass the arch wire 23 gingival to the buccal-lingual extending edges 35 of the notches in the bracket body legs 32, to thereby permit freedom of tipping of the tooth in the mesial-distal directions. Opposite the occlusal or tail end 29 of the pin, a head 37 is provided which is adapted to be positioned on the gingival side of the bracket when the pin and bracket are assembled in accordance with the preferred embodiment of the invention and as disclosed in FIG. 1. An arch wire receiving slot 38 is provided along the lingual edge of the lock pin and immediately occlusal to the pin head 37, while a shoulder 39 is defined immediately occlusal to the head 37 and along the buccal edge of the pin. Between the slot 38 and the tail 29, a relatively enlarged body section 40 is provided which is defined by a buccal-lingual depth between a lingual edge 41 extending parallel to a buccal edge 42, the latter also defining the buccal edge of the tail end 29. The occlusal end of the lingual edge 41 connects with the lingual end of a downwardly inclined lingual-buccal edge 43 which has its other end intersecting with the upper or gingival end of a lingual edge 44 defining the lingual edge of the tail end 29. Thus a reduction of the buccal-lingual depth of the body section 40 is effected in the tail section 29, thereby permitting upon initial insertion of the lock pin into a bracket opening the tilting of the lock pin bucally away from the tooth and band to permit easy insertion of the arch wire in the slot 38. The head 37 is provided with a nose 37a at the lingual edge thereof which extends lingual to the lingual edge 41 and is adapted to seat on the gingival edge of the band as seen in FIG. 3 and further prevent the pin from being displaced bucally when it is properly secured to the band. It should be appreciated that the lock pin 21 may be made with only the shoulder 39 or only the nose 37a, or with both the shoulder and nose as shown. But the lock pin will function to position the arch wire as shown in FIG. 3 whether the shoulder, nose or both are on the pin. It may be noted that the buccal seating edge of the nose 37a is coincident to the buccal face of the arch wire slot 38, although it should be appreciated that it may be gingival or occlusal thereto if so desired. Once the pin has been inserted as shown particularly in FIG. 3, the buccal edge 42 intimately engages the lingual side of the bight or connecting leg 33 of the bracket, while the lingual edge 41 intimately engages the outer or buccal surface of the band 24 which automatically draws the pin head 37 toward the tooth until the shoulder 39 is seated against the gingival edge of the bight or connecting leg 33 of the bracket and the nose 37a of the head 37 seats against the gingival edge of the band 24. Effectively, the lock pin attaches or secures the arch wire to the band and bracket. The buccal lingual depth of the arch wire slot 38 is slightly greater than the buccal-lingual dimension of the arch wire, while the occlusal-gingival depth of the slot is intended to be substantially larger than the occlusal-gingival dimension of the arch wire to prevent freedom of tilting of the arch wire relative to the lock pin 21. And as seen particularly in FIG. 1A, the lingual edges 34 of the notches in the bracket are coplanar with the lingual face 38a of the slot 38 to thereby provide a larger support of the arch wire 23 at the pin and bracket appliance. When the lock pin 21 is suitably seated, the tail end 29 may be bent over the occlusal end of the bracket body to secure the pin in place as particularly shown in FIG. 1 on tooth 27. The arch wire shown is cylindrical although any type of wire may be employed. Likewise, the shape of the arch wire receiving slot 38 may be of any suitable type.

When it is desired to control the tooth movement in the mesial-distal direction, a conventional lock pin having no positioning shoulder and a head that does not rest on the gingival edge of the band would be employed to draw the arch wire down against the gingival side of the bracket. To illustrate the use of the bracket 22 for this purpose, reference is made to FIGS. 5 and 6 wherein a lock pin 45 is shown in combination with the bracket 22. In this instance, the lock pin is not provided with an arch wire slot, but merely with a head 46 having buccal-lingual depth equal to slightly less than the buccal-lingual depth in the opening 30. Directly occlusal to the head 46 is a shoulder 47 for engaging the gingival side of the arch wire 23 and locking the arch wire in the notched end of the bracket, thereby drawing the arch wire 23 directly against the gingival edges 35 of the notches in the bracket body legs or walls 32. To provide additional support of the arch wire, arch wire supporting bars 48, 48 extending buccal-lingually are provided at the mesial and distal ends of the attaching flanges 36. These bars include gingival edges or faces 49, 49 coplanar with the gingival edges 35 and occlusal ends 50, 50 coplanar with the occlusal end of the bracket body 31. Thus the arch wire 23 is also drawn downwardly against the gingival faces 49 of the arch wire supporting bars 48. Again to secure the pin 45 in place, it is necessary to bend the tail 51 over the occlusal end of the bracket 22. Thus it may be appreciated that with the pin 45 which is capable of drawing the arch wire down against the gingival side of the bracket, control of the tooth movement in the mesial-distal direction is accomplished.

Therefore, the bracket 22 may be used with the lock pin 21 if freedom of tipping in the mesial-distal direction is desired, or with the lock pin 45 if positive control of teeth movement in the mesial-distal direction is desired.

A modification of the invention is disclosed in FIG. 7, wherein a modified bracket 52 may be employed in place of the bracket 22. In this embodiment, the same type of lock pins may be used to either space the arch wire from the bracket or to draw the arch wire against the bracket as shown in FIGS. 5 and 6. This embodiment differs from the embodiment of FIGS. 1 and 2 in that the arch wire supporting bars 53, 53 extend perpendicular to the attaching flanges 54, 54 and perpendicular to the longitudinal axis of the bracket body 55. Actually the upper gingival surface of the arch wire supporting bars 53 provides a fuller and more complete supporting surface along the band but otherwise functions the same as the embodiment in FIGS. 5 and 6 when it is desired to control the mesial-distal direction of tooth movement.

Another embodiment of the invention is disclosed in FIGS. 8 and 9. Again the lock pins 21 and 45 may be interchangeably employed in order to provide the desired mesial-distal control of the tooth. This bracket may be generally designated by the numeral 56 and is similarly provided with a pin receiving opening extending occlusal-gingivally. When the lock pin 21 is employed, the shoulder 39 will engage the gingival end 57 of the bracket, while the arch wire 23 will be drawn against the gingival arch wire supporting surface 58 during usage of the pin 45. Otherwise, the function of this bracket will be like the function of the other brackets heretofore described.

Still another form of bracket is shown in FIGS. 10 and 11 wherein the bracket is generally designated by the numeral 59. This bracket is L-shaped in cross section as seen in FIG. 11 and inverted T-shaped in front elevational view as seen in FIG. 10. A central lock pin opening 60 is positioned between laterally arranged lock pin openings 61 and 62 to thereby provide a bracket capable of receiving one, two or three lock pins, depending upon the particular function desired to be accomplished as to tooth movement. The central opening might receive a lock pin 21 if it is desired to have freedom of tipping in the mesial-distal direction of a tooth or a lock pin 45 to control mesial-distal tooth movement, while more secure fastening of an arch wire to the bracket and band could be accomplished by utilizing a pair of pins 45 in the lock pin openings 61 and 62. And if so desired, a third lock pin 45 may be used in the lock pin opening 60 to further rigidify the attachment of the arch wire to the bracket and band. When employing a pin 21, the shoulder 39 would engage and seat against the gingival end 63 around the central lock pin opening 60, while using one or more lock pins 45 would draw the arch wire down against the gingival arch wire supporting surface 64.

A still different form of bracket is disclosed in FIGS. 12 and 13, wherein the bracket is generally designated by the numeral 65. The lock pin is slightly different from the lock pin 21 and accordingly will be designated by the numeral 66 although the general purpose accomplished by the lock pin 21 and bracket 22 is also effected by the lock pin 66 and bracket 65. In this embodiment, the bracket 65 includes a body 67, substantially U-shaped in cross section, and having its longitudinal axis extending mesial-distally. The body 67 includes a gingival wall 68, an occlusal wall 69 and a buccal wall 70, wherein the gingival wall is further connected to an attaching flange 71 while the buccal wall is further attached to an attaching flange 72. Again the attaching flanges 71 and 72 may be spot welded and/or soldered to the tooth band 24. A gingival-occlusally extending lock pin opening 73 is defined by openings through the gingival wall 68 and the occlusal wall 69 and for receiving the lock pin 66.

The lock pin 66 differs from the lock pin 21 in that the arch wire receiving slot 74 is spaced gingivally of the shoulder 75 so that when the shoulder of the pin is seated against the gingival end of the bracket 65, the arch wire will be spaced above the gingival surface of the gingival wall 68. As shown particularly in FIG. 12, the tooth designated by the numeral 76 shows the initial assembly operation of the pin 66 relative to the bracket 65, while the tooth designated by the numeral 77 illustrates the lock pin 66 in seated position and properly positioning the arch wire above the gingival wall 68. Finally, the tooth designated by the numeral 78 illustrates the tail end 79 of the lock pin 66 as being bent over against the occlusal side of the occlusal wall 69 to firmly secure the lock pin in position relative to the bracket.

When it is desired to control the mesial-distal movement of a tooth wherein the bracket 65 is employed, the pin 45 may be used in combination with the bracket to draw the arch wire down against the gingival wall 68 thereof.

A variation of the bracket 65 is shown in FIG. 14 and designated by the numeral 80 which differs therefrom only in that three gingival-occlusally extending lock pin openings 81, 82 and 83 are provided instead of a single opening. Thus, this embodiment is somewhat similar to the embodiment disclosed in FIG. 9 wherein a plurality of lock pins may be mounted on a single bracket to give further support to the arch wire in securing relationship to the band. As seen particularly in FIG. 19, a pair of lock pins 45 are shown in position in the openings 81 and 83 to draw the arch wire 23 downwardly against the gingival side of the bracket.

A still further embodiment of the invention is illustrated in FIG. 15, wherein a milled bracket 84 is shown having lock pin openings 85 for receiving a plurality of lock pins if so desired. This embodiment would be the equivalent of the stamped bracket 80 in FIG. 18 with the exception that it would tend to be stronger in that it is of a heavier construction.

When it is desired to accomplish changes in the labial-lingual inclination of a tooth, two arch wires may be locked to a bracket by either lock pin arrangement, and loops or spurs would be formed in one of the arch wires to apply pressure against the tooth. And in the embodiment shown in FIG. 19, such a loop or spur would be formed vertically between the lock pins 45.

Another form of lock pin for use with either of the brackets 65, 80 or 84 is shown in FIGS. 16 and 17 and generally designated by the numeral 86. This lock pin differs from the lock pin 66 in that the shoulder is formed by bending the buccal edge portion 87 of the head of the pin at right angles to the body of the pin to thereby define a shoulder 88 which will engage the gingival end of a bracket such as shown with respect to the bracket 65 in FIG. 16 and still position the arch wire 23 gingival to the bracket. Moreover, the lingual side 89 of the buccal edge 87 is coplanar with the buccal end face 90 of the arch receiving slot 91 to provide further support against the buccal surface of the arch wire and further hold the arch wire against the tooth band to control and/or effect rotations of the tooth. Otherwise, the function of this lock pin is similar to the function of the lock pin 66.

It should be readily appreciated that the bracket embodiments of this invention may be formed by stamping same from a sheet material, milling same from a solid block of material, milling sections from an extrusion of material, casting in a suitable material, or by any other suitable method. The lock pins may be formed by similar methods.

It will be understood that modifications and variations may be effected without departing from the scope of the novel concepts of the present invention, but it is understood that this application is to be limited only by the scope of the appended claims.

The invention is hereby claimed as follows:

1. An orthodontic lock pin and bracket appliance comprising a bracket secured to a tooth band having a body extending outwardly thereof, an opening through said body extending occlusal-gingivally, and a lock pin received in said opening for securing an arch wire to the band, said lock pin being engaged with the bracket body and having a slot at the lingual edge for receiving an arch wire, and means thereon for spacing the arch wire slot away from the body to thereby permit the tooth to tip freely mesial-distally.

2. An orthodontic lock pin and bracket appliance comprising a bracket secured to a tooth band adapted to be mounted on a tooth, said bracket having a body with an occlusal-gingivally extending opening therethrough, and a lock pin received in said opening and engaged with the bracket body and having a slot formed at the lingual edge thereof for receiving an arch wire, and a shoulder on said pin engaging said body and positioning said slot and an arch wire to be received therein away from said body to permit the tooth to tip freely mesial-distally.

3. An orthodontic lock pin and bracket appliance comprising a bracket secured to a tooth band adapted to be mounted on a tooth, said bracket having a body with an occlusal-gingivally extending opening therethrough, and a lock pin received in said opening having a slot formed at the lingual edge thereof for receiving an arch wire, said pin being inserted in the gingival end of said opening in engagement with said body to position an arch wire on the gingival side of the bracket body, and a shoulder on said pin engaging the gingival end of the bracket body and arranged relative to said slot to position said slot and an arch wire to be received therein in spaced relation to the gingival side of the bracket body to permit the tooth to tip freely mesial-distally.

4. An orthodontic lock pin and bracket appliance comprising a bracket secured to a tooth band adapted to be mounted on a tooth, said bracket having a body with an occlusal-gingivally extending opening therethrough, and a lock pin received in said opening having a slot formed at the lingual edge thereof for receiving an arch wire, said pin being inserted in the gingival end of said opening in engagement with said body to position an arch wire on the gingival side of the bracket body, a shoulder on said pin engaging the gingival end of the bracket body and arranged relative to said slot to position said slot and an arch wire to be received therein in spaced relation to the gingival side of the bracket body to permit the tooth to tip freely mesial-distally, and means on the bracket at the mesial and distal sides of the bracket body having buccal-lingual extending surfaces coplanar with a buccal-lingual surface defined at the gingival end of the bracket body.

5. An orthodontic lock pin and bracket appliance comprising a bracket secured to a tooth band adapted to be mounted on a tooth, said bracket having a body with at least one occusal-gingivally extending lock pin opening therethrough, a wire receiving notch at the gingival end and lingual edge of said bracket, said notch including an occlusal-gingivally extending side facing said band and being substantially parallel thereto and a buccal-lingual extending side being substantially perpendicular to said band, buccal-lingual supporting means on the mesial and distal sides of said opening having a gingival surface coplanar with the buccal-lingual extending side of said notch, and a lock pin received in said opening having a slot formed at the lingual edge thereof for receiving an arch wire, said pin being inserted in the gingival end of said opening in engagement with said body to position and arch wire on the gingival side of the bracket body, and a shoulder on said pin engaging the gingival end of the bracket body and arranged relative to said slot to position said slot and an arch wire to be received therein in spaced relation to the gingival side of the bracket body to permit the tooth to tip freely mesial-distally.

6. An orthodontic lock pin and bracket appliance comprising a bracket secured to a tooth band adapted to be mounted on a tooth, said bracket having a body with at least one occlusal-gingivally extending lock pin opening therethrough, a wire receiving notch at the gingival end and lingual edge of said bracket, said notch including an occlusal-gingivally extending side facing said band and being substantially parallel thereto and a buccal-lingual extending side being substantially perpendicular to said band, buccal-lingual supporting means on the mesial and distal sides of said opening having a gingival surface coplanar with the buccal-lingual extending side of said notch, and a lock pin received in said opening having a slot formed at the lingual edge thereof for receiving an arch wire, said pin being inserted in the gingival end of said opening in engagement with said body to position an arch wire on the gingival end of the bracket body, and a shoulder on the buccal side of the pin engaging the gingival end of the bracket body to position the pin relative thereto, said shoulder being arranged relative said slot to position said slot and an arch wire to be received therein in gingival spaced relation to the buccal-lingual extending side of said notch and the buccal-lingual supporting means to permit the tooth to tip freely mesial-distally.

7. An orthodontic lock pin and bracket appliance comprising a bracket secured to a tooth band adapted to be mounted on a tooth, said bracket having a body with at least one occlusal-gingivally extending lock pin opening therethrough, a wire receiving notch at the gingival end and lingual edge of said bracket, said notch including an occlusal-gingivally extending side facing said band and being substantially parallel thereto and a buccal-lingual extending side being substantially perpendicular to said band, buccal-lingual supporting means on the mesial and distal sides of said opening having a gingival surface coplanar with the buccal-lingual extending side of said notch, and a lock pin received in said opening in engagement with said body and having a slot formed at the lingual edge thereof for receiving an arch wire, said slot having a buccal-lingual depth slightly greater than the buccal-lingual depth of an arch wire to be received therein and an occlusal-gingival depth substantially greater than the occlusal-gingival depth of an arch wire.

8. The combination as set forth in claim 6, wherein the buccal-lingual supporting means comprises a pair of upright bars, the upper ends of which are adapted to support an arch wire when the wire is drawn thereagainst.

9. The combination as set forth in claim 6, wherein the buccal-lingual supporting means comprises a pair of horizontally extending bars, the upper surfaces of which are adapted to support an arch wire when the wire is drawn thereagainst.

10. An orthodontic lock pin and bracket appliance comprising a bracket secured to a tooth band adapted to be mounted on a tooth, said bracket having an elongated body with the longitudinal axis extending mesial-distally, at least one occlusal-gingivally extending lock pin opening in said body, and a lock pin received in said opening having a slot formed at the lingual edge thereof for receiving an arch wire, said pin being inserted in the gingival end of said opening in engagement with said body to position an arch wire on the gingival side of the bracket body, and a shoulder on said pin engaging the gingival end of the bracket body and arranged relative to said slot to position said slot and an arch wire to be received therein in spaced relation to the gingival side of the bracket body to permit the tooth to tip freely mesial-distally.

11. An orthodontic lock pin and bracket appliance comprising a bracket secured to a tooth band adapted to be mounted on a tooth, said bracket having an elongated body with the longitudinal axis extending mesial-distally, at least one occlusal-gingivally extending lock pin opening in said body, and a lock pin received in said opening having a slot formed at the lingual edge thereof for receiving an arch wire, said pin being inserted in the gingival end of said opening in engagement with said body to position an arch wire on the gingival side of the bracket body, said pin having a body with head and tail sections, the buccal edge portion of the head section being bent relative the body to define a shoulder for engagement with the gingival side of the bracket body and arranged relative to said slot to position said slot and an arch wire to be received therein in spaced relation to the gingival side of the bracket body to permit the tooth to tip freely mesial-distally.

12. An orthodontic lock pin and bracket appliance comprising a bracket secured to a tooth band adapted to be mounted on a tooth, said bracket having an elongated body with the longitudinal axis extending mesial-distally, at least one occlusal-gingivally extending lock pin opening in said body, and a lock pin received in said opening having a slot formed at the lingual edge thereof for receiving an arch wire, said pin being inserted in the gingival end of said opening in engagement with said body to position an arch wire on the gingival side of the bracket body, said pin having a body with head and tail sections, the buccal edge portion of the head section being bent perpendicular to the body to define a shoulder for engagement with the gingival side of the bracket, the gingival side of the bent buccal edge portion being coplanar with the occlusal-gingivally extending side of the slot thereby engaging the buccal side of an arch wire to be received in said slot and further supporting same against the tooth band, and said shoulder being arranged relative to said slot to position said slot and an arch wire to be received therein in spaced relation to the gingival side of the bracket body to permit the tooth to tip freely mesial-distally.

13. An orthodontic bracket adapted to be mounted on a tooth band and to be used with a lock pin for attaching an arch wire to a tooth, said bracket having an elongated body having its longitudinal axis extending occlusal-gingivally, a lock pin opening in said body extending occlusal-gingivally, a wire receiving notch at the gingival end and lingual edge of said bracket, said notch including an occlusal-gingivally extending side facing said band and being substantially parallel thereto and a buccal-lingual extending side being substantially perpendicular to said band, attaching flanges extending from the lingual side of said bracket body adapted to be permanently secured to said band, and arch wire buccal-lingual extending supporting means on the mesial and distal sides of said opening and extending from said attaching flanges, said means having gingival surfaces coplanar with the buccal-lingual extending side of said notch.

14. A lock pin for use with an orthodontic bracket having an occlusal-gingivally extending lock pin opening, said pin comprising an elongated body having a head at one end and a tail at the other end, said body having a buccal-lingual depth substantially equal to the buccal-lingual depth of said opening, said head having a buccal-lingual depth greater than said body with the lingual edge being coplanar with the lingual edge of the body thereby defining a shoulder at the buccal edge thereof, an arch wire receiving slot in the lingual edge of the pin positioned to coact with said shoulder to space an arch wire to be used therewith gingival to the gingival edge of the bracket.

15. An orthodontic lock pin and bracket appliance comprising a bracket secured to a tooth band adapted to be mounted on a tooth, said bracket having a body with an occlusal-gingivally extending opening therethrough, and a lock pin received in said opening having a slot formed at the lingual edge thereof for receiving an arch wire, and a nose on said pin at the lingual edge thereof seated on the gingival edge of the band to position the slot and an arch wire to be used therewith gingival to said body to permit the tooth to tip freely mesial-distally.

16. An orthodontic lock pin and bracket appliance comprising a bracket secured to a tooth band adapted to be mounted on a tooth, said bracket having a body with an occlusal-gingivally extending opening therethrough, and a lock pin received in said opening having a slot formed at the lingual edge thereof for receiving an arch wire, a shoulder on the buccal edge of the pin seated on the gingival edge of said body, and a nose on the lingual edge of the pin seated on the gingival edge of the band and thereby coacting with said shoulder to position the slot and an arch wire to be used therewith gingival to said body to thereby permit the tooth to tip freely mesial-distally.

References Cited in the file of this patent
UNITED STATES PATENTS
2,045,025   Richardson _____ June 23, 1936